United States Patent [19]
Barber et al.

[11] Patent Number: 5,973,670
[45] Date of Patent: Oct. 26, 1999

[54] TACTILE FEEDBACK CONTROLLER FOR COMPUTER CURSOR CONTROL DEVICE

[75] Inventors: Ronald Jason Barber, San Jose; Edwin Joseph Selker, Palo Alto, both of Calif.

[73] Assignee: International Business Machines Corporation, Armonk, N.Y.

[21] Appl. No.: 08/775,845

[22] Filed: Dec. 31, 1996

[51] Int. Cl.⁶ .................................................. G09G 5/08
[52] U.S. Cl. .......................................... 345/157; 345/145
[58] Field of Search ..................................... 345/145, 146, 345/157, 159, 161, 163, 167; 463/30, 31, 35, 37, 38

[56] References Cited

U.S. PATENT DOCUMENTS

| | | | |
|---|---|---|---|
| 4,667,182 | 5/1987 | Murphy | 340/407 |
| 4,868,549 | 9/1989 | Affinito et al. | 340/710 |
| 4,905,001 | 2/1990 | Penner | 341/20 |
| 4,964,004 | 10/1990 | Barker | 360/14.1 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,223,828 | 6/1993 | McKiel, Jr. | 340/825.19 |
| 5,255,211 | 10/1993 | Redmond | 364/578 |
| 5,268,674 | 12/1993 | Howard et al. | 345/163 |
| 5,287,102 | 2/1994 | McKiel, Jr. | 340/825.19 |
| 5,570,111 | 10/1996 | Barrett et al. | 345/157 |
| 5,699,082 | 12/1997 | Marks et al. | 345/157 |
| 5,703,620 | 12/1997 | Keyson | 345/145 |
| 5,710,574 | 1/1998 | Jaaskelainen | 345/145 |
| 5,714,978 | 2/1998 | Yamanaka et al. | 345/157 |
| 5,736,978 | 4/1998 | Hasser et al. | 345/156 |
| 5,742,278 | 4/1998 | Chen et al. | 345/156 |
| 5,764,219 | 6/1998 | Rutledge et al. | 345/145 |
| 5,781,179 | 7/1998 | Nakajima et al. | 345/157 |
| 5,825,308 | 10/1998 | Rosenberg | 345/145 |

FOREIGN PATENT DOCUMENTS

| | | |
|---|---|---|
| 0 265 011 | 10/1987 | European Pat. Off. . |
| 0 607 580 A1 | 12/1993 | European Pat. Off. . |
| 4140780A1 | 9/1992 | Germany . |
| 3-184117 | 8/1991 | Japan . |

OTHER PUBLICATIONS

J. A. Terry et al., "Tactile Feedback in a Computer Mouse", 14th Northeast Bioengineering Conference, 1988 *IEEE*, pp. 146–149.

C. J. Evangelisti et al., "Joystick with Tactile Feedback", *Research Disclosure*, No. 283, Nov. 1987.

M. Akamatsu et al., "A Multi–modal Mouse with Tactile and Force Feedback", *Int. J. Human–Computer Studies*, 1994, pp. 443–453.

Susan M. Cardwell, "Capacitive Stylus Design", *Hewlett–Packard Journal*, Jan. 1981, pp. 17–18.

R. T. Rakowski et al., "Magnetoresistive Force Sensors for use in an Instrumented Pen", *Sensors and Actuators A. 37–38*, 1993, pp. 422–429.

K. Maeda, "Light Pen", *IBM Technical Disclosure Bulletin*, vol. 30, No. 12, May 1988, pp. 278–279.

F. J. Affinito et al., "Braille Computer Mouse with Tactile Position Feedback", *IBM Technical Disclosure Bulletin*, vol. 31, No. 12, May 1989, p. 386.

J. G. McLean et al., "Mouse Ball–Actuating Device with Force and Tactile Feedback", *IBM Technical Disclosure Bulletin*, vol. 32, No. 9B, Feb. 1990, pp. 230–235.

European Search Report for Application No. 97309658.9.

*Primary Examiner*—Jeffery Brier
*Assistant Examiner*—Paul Bell
*Attorney, Agent, or Firm*—Gray Cary Ware Freidenrich

[57] ABSTRACT

A cursor on a graphics display is controlled by a cursor control device including a tactile generator. The tactile generator is activated when the cursor is located at a graphics object that has been determined to be interesting, and that has a size which bears a predetermined relationship to the speed of the cursor, provided an update time has elapsed since the time of the last tactile activation of the cursor control device.

20 Claims, 3 Drawing Sheets

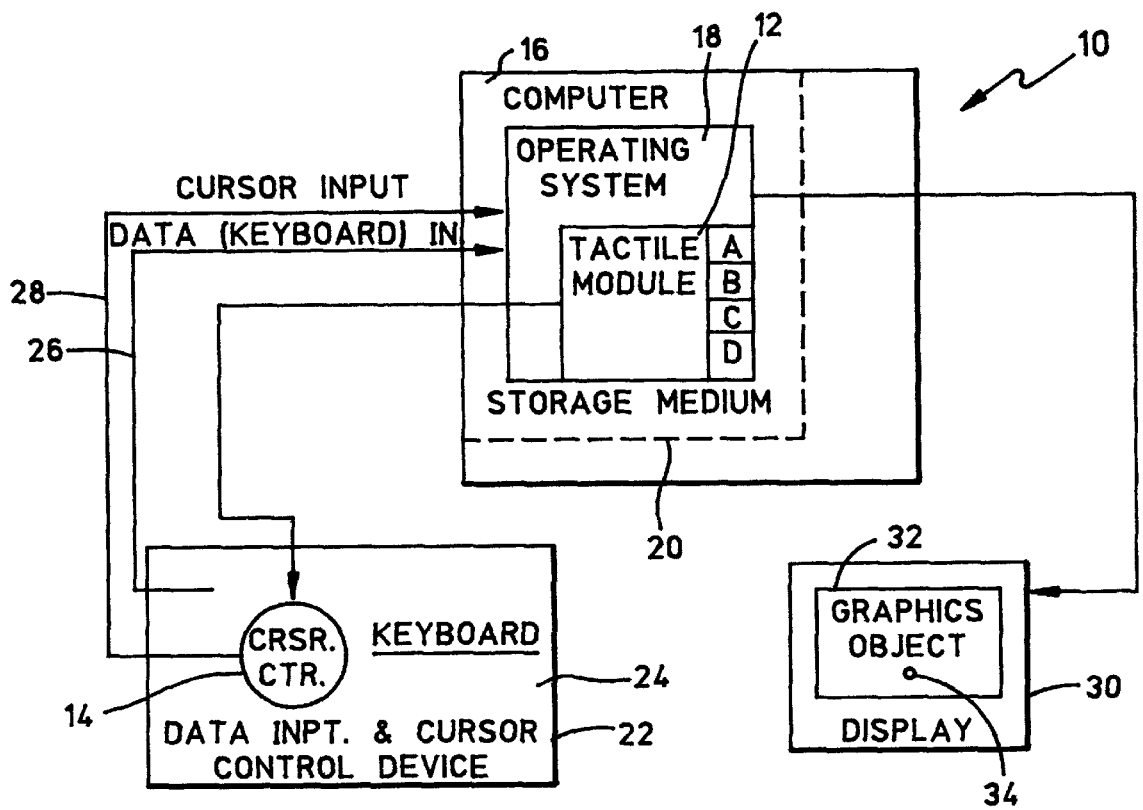
FIG. 1
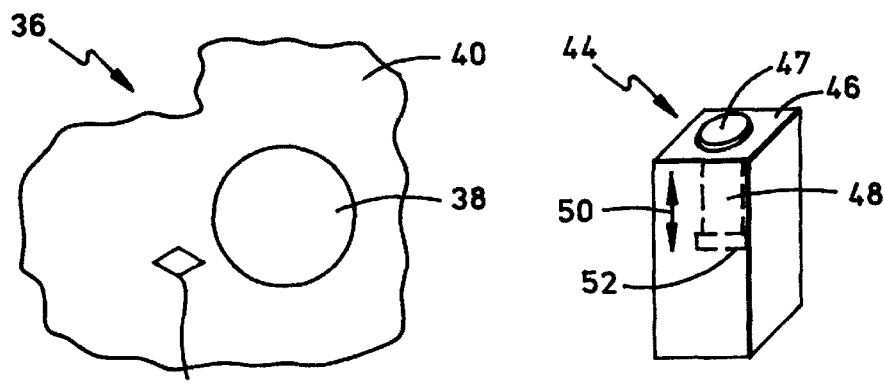
FIG. 2
FIG. 3

TACTILE FEEDBACK CONTROLLER FOR COMPUTER CURSOR CONTROL DEVICE

BACKGROUND OF THE INVENTION

1. Field of the Invention

The present invention relates generally to computer cursor control devices, and more particularly to methods and apparatus for establishing tactile feedback in a cursor control device based on an associated computer's displayed graphical presentation.

2. Description of the Related Art

The immense rise in popularity of personal computers is in large part attributable to improvements in user-machine interfaces. More particularly, the improvements in data input devices, such as the mouse and the trackball, have made communication with computers easy and convenient, thus increasing the usefulness of computers.

As is well-known, a mouse and a trackball are useful devices for positioning a cursor on a computer display. To quickly and efficiently input certain types of data or commands to a computer, the cursor is positioned on an appropriate graphics object and then manipulated (colloquially referred to as "clicked"). It will readily be appreciated that the convenience and, thus, usefulness of the computer is promoted by facilitating rapid, yet precise, cursor placement.

Representative of such cursor control devices is the device sold under the trademark "Trackpoint" by International Business Machines Corporation of Armonk, N.Y., the assignee of the present invention. Details of the "Trackpoint" device are disclosed in related U.S. patent applications Ser. Nos. 07/917,091 and 08/006,427, both of which are assigned to International Business Machines Corporation and incorporated herein by reference.

It happens, unfortunately, that rapid cursor positioning is more or less competitive with precise cursor positioning. This is because the faster the cursor moves across the screen, the less time the user has to react to stop the cursor when it arrives at the desired screen location. Stated differently, the user is provided with only one kind of feedback, namely, visual feedback, to aid the user in stopping a rapidly moving cursor, and visual feedback alone often is insufficient to promote both rapid and precise cursor placement.

As the present invention recognizes, however, both rapid and precise cursor placement can be enhanced if more than one kind of feedback is provided to the user. More specifically, the present invention recognizes that tactile feedback can be used in conjunction with visual feedback to promote both rapid and precise cursor placement.

As still further recognized herein, while tactile feedback can be effective for its intended purpose, providing a tactile feedback signal every time a cursor crosses a semantic boundary can be somewhat distracting, thereby detracting from the advantages provided by the device. Accordingly, the present invention recognizes that the effectiveness of tactile feedback in a cursor control device can be promoted by rendering tactile feedback only upon certain predetermined conditions.

It is therefore an object of the present invention to provide a cursor control system that generates a tactile feedback signal to a user when a cursor controlled by the system crosses a graphics boundary. Another object of the present invention is to provide a cursor control system that generates a tactile feedback signal only when a cursor crosses a tactile boundary defined to be "interesting". Still another object of the present invention is to provide a cursor control system that generates a tactile feedback signal in part based on the speed of the cursor. Yet another object of the present invention is to provide a cursor control system that generates a tactile feedback signal in part based on the time since a tactile feedback signal was last generated. Another object of the present invention is to provide a cursor control system that is easy to use and cost-effective.

SUMMARY OF THE INVENTION

Our invention determines whether to tactilely stimulate a cursor control device that is configured for controlling the motion of a cursor on a computer display. Stated differently, our invention selectively generates a tactile signal in a cursor control device.

According to our invention, a digital processing system determines when a cursor is located at a boundary of a graphical object on the computer display. If the graphical object is "interesting" a relationship of the size of the graphical object with the speed of the cursor is determined. When the relationship at least equals a threshold relationship, the tactile signal is output to thereby activate a tactile generator in the cursor control device.

Preferably, the relationship is determined by determining the ratio of the size of the graphical object to the speed of the cursor. More preferably, the relationship is determined by determining the ratio of the size of the graphical object in the dimension defined by the direction of motion of the cursor, to the speed of the cursor.

Moreover, whether the graphical object is "interesting" is determined by querying an operating system of the digital processing apparatus for a classification of the graphical object. If it is determined that the graphical object is a member of a predetermined set of objects, the object is deemed "interesting".

Advantageously, the determination to tactilely stimulate may be made in a digital processing system without operating system interaction. Specifically, the computer display includes a plurality of pixels, with each pixel being defined by a row and a column of a scanning matrix and each pixel having a time-varying color. In this case, the attribute of "interesting" is determined by determining a cursor pixel at which the cursor is located, and determining whether the color of the cursor pixel is the same as the colors of the pixels immediately adjacent the cursor pixel in the column of the cursor pixel. If the color of the cursor pixel is the same as the colors of the pixels immediately adjacent the cursor pixel in the column of the cursor pixel, the column of the cursor pixel is defined to be an interesting graphical object. Otherwise, it is determined whether the color of the cursor pixel is the same as the colors of the pixels immediately adjacent the cursor pixel in the row of the cursor pixel. If the color of the cursor pixel is the same as the colors of the pixels immediately adjacent the cursor pixel in the row of the cursor pixel, the row of the cursor pixel is defined to be an interesting graphical object, and otherwise neither the row nor column of the cursor pixel is defined to be an interesting object.

Further, the tactile signal is not generated when a previous tactile signal has been generated within a predetermined time period of the cursor being located at a boundary of a graphical object.

In a specific aspect, a tactile generating system for tactilely stimulating a cursor control device that controls the movement of a cursor on a computer display includes logic for determining whether the cursor is at a boundary of a graphical object. The logic also determines whether the object is a tactile object, and determines, when the object is a tactile object, a size of the object and a speed of the cursor. The logic also determines whether to tactilely stimulate the cursor control device.

In still another aspect, a computer-implemented method is disclosed for tactilely stimulating a cursor control device when a cursor controlled by the device is located at a graphics object. The cursor control device is stimulated when the graphics object has a size that bears a predetermined relationship to the speed of the cursor, and when the cursor control device has not been stimulated for a predetermined time period.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram of a computer system incorporating a tactile feedback controller according to this invention;

FIG. 2 is a fragmentary plan view of a mouse or trackball cursor control device, with a tactile generator shown in phantom;

FIG. 3 is a fragmentary plan view of a pointing stick cursor control device, with a tactile generator shown partially in phantom;

DETAILED DESCRIPTION OF THE PREFERRED EMBODIMENTS

Figure 4:
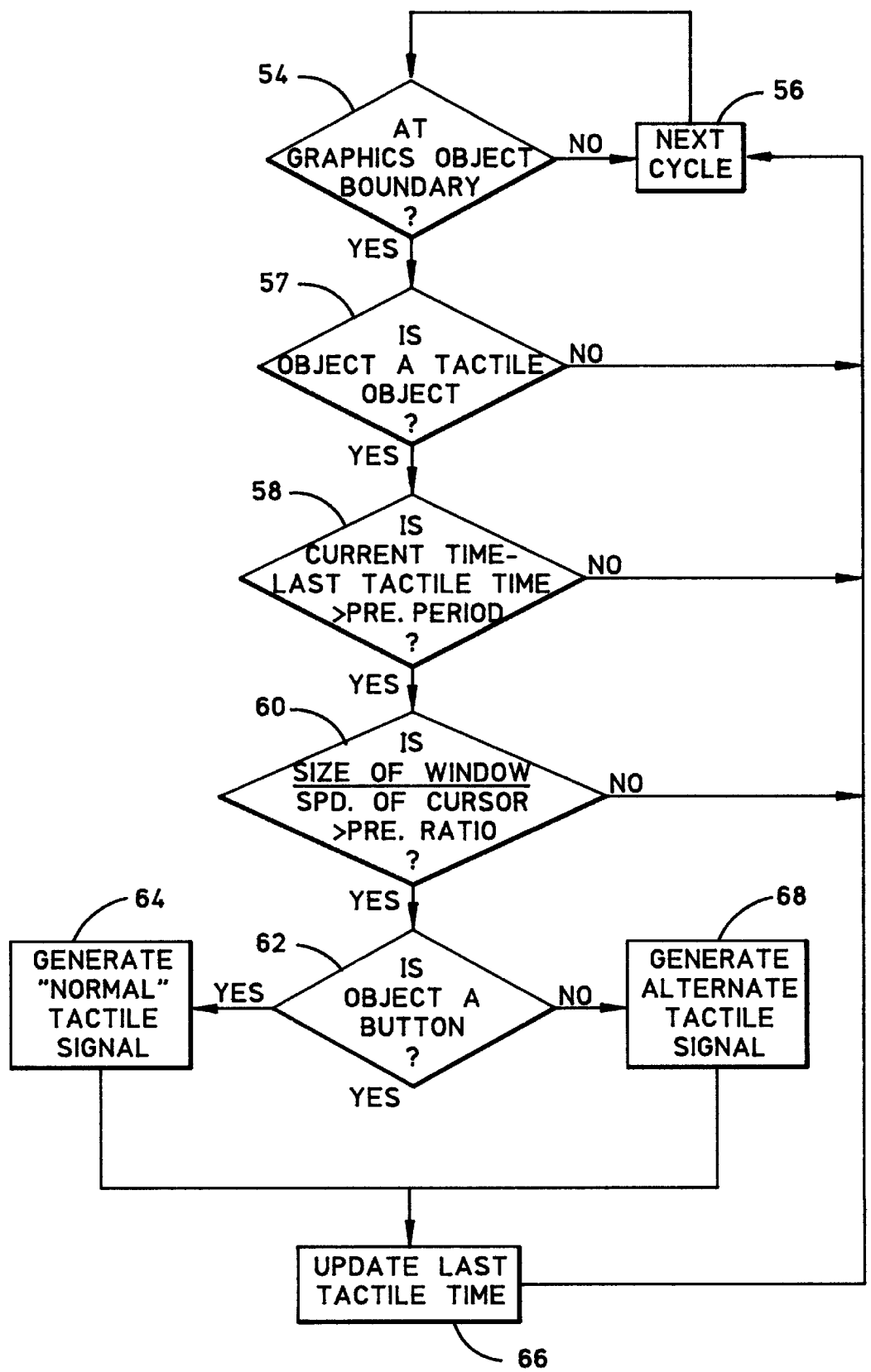
FIG. 4 is a flow chart of the tactile control logic embedded in a computer operating system.

Referring initially to FIG. 1, a system, generally designated 10, is shown which includes a tactile module 12 for generating a tactile signal to cause a cursor control device 14 to be tactilely activated as described in detail below. The cursor control device 14 can be mouse, pointer stick (also referred to as a "joystick"), or a trackball. As shown in FIG. 1, the system 10 also includes a computer 16 having a computer operating system 18.

In one presently preferred embodiment, the computer 16 is a laptop computer, personal computer, mainframe computer, or RS6000/250 workstation computer made by International Business Machines Corporation of Armonk, N.Y., and the operating system 18 is the operating system sold by the International Business Machines Corporation under the trade name "OS/2". It can be appreciated in reference to FIG. 1 that the tactile module 12 can be incorporated in the operating system 18, with the tactile module 12 and operating system 18 being rendered in logical form on an electronic storage medium 20, in the computer 14. In an alternative embodiment discussed in relation to FIGS. 5 and 6 below, the tactile module 12 can be separate from but accessible to the operating system 18, and may be embodied as microcode in a programmable device, or as an application-specific integrated circuit (ASIC).

FIG. 1 additionally shows that the cursor control device 14 can be incorporated in a combined data input and cursor control device (DICC) 22. Accordingly, the DICC 22 includes a means for entry of data, e.g., a keyboard 24. Alternatively, the DICC 22 can include a voice data entry mechanism or other suitable data entry device. In the preferred embodiment, with the exception of the modifications noted below in reference to FIGS. 2 and 3, the DICC 22 is made by 10 International Business Machines Corporation and sold under the trade name "Trackpoint III".

In accordance with principles well-known in the art, data can be input from the DICC 22 to the computer 16 via a data input line 26 by appropriately manipulating the keyboard 24. Furthermore, data for the purpose of controlling a cursor on a computer display can be input from the DICC 22 to the computer 16 via a cursor input line 28 by appropriately manipulating the cursor control device 14.

In response to data that is input from the DICC 22 and in response to applications which are accessible to the operating system 18, the operating system 18 gas controls the graphical presentation of a computer display 30. As shown in FIG. 1, the display 30 can present a graphical object 32, and typically also displays a cursor 34, the position and motion of which are controlled by appropriately manipulating the cursor control device 14. As intended by the present invention, the tactile module 12 causes the cursor control device 14 to vibrate or otherwise to be tactilely stimulated when the cursor 34 crosses a boundary of the graphics object 32, provided the inventive conditions disclosed below are met.

Now referring to FIG. 2, a cursor control device is shown, generally designated 36, which includes a ball 38 that is movably disposed in a housing 40. A relay 42 is mounted on the housing 40 adjacent the ball 38, and the relay 42 is energized and deenergized in response to the tactile signal generated by the tactile module 12.

Alternatively energizing and deenergizing the relay 42 causes the housing 40 to vibrate. In other words, the relay 42 is a tactile generator that is tactilely activated to thereby tactilely stimulate the cursor control device 36. As the skilled artisan will recognize, the ball 38 can be movable element of a mouse, in which case the view shown in FIG. 2 is a schematic bottom plan of a mouse input device, or the ball 38 can be a trackball, in which case the view shown in FIG. 2 is a schematic top plan of a trackball input device. In any case, apart from the relay 42 and accompanying electrical components that transfer the tactile signal to the relay 42 in accordance with well-understood principles, the operation and construction of the cursor control device 36 is identical to conventional mouses or trackballs.

Alternatively, the cursor control device of the present invention can be the pointing stick 44 (also referred to as a "joystick") shown in FIG. 3. The pointing stick 44 includes a manipulable hollow handle 46 having a plunger 48 reciprocatingly disposed therein for longitudinal motion relative thereto, i.e., for motion in the directions indicated by the arrows 50. If desired, a rubber end 47 can be provided on the plunger 48 such that the rubber end 47 can contact a user's finger when a tactile signal is generated as described below. A piezoelectric element 52 is positioned in the handle 46 in contact with the plunger 48. Together, the piezoelectric element 52 and plunger 48 establish a tactile generator.

It is to be understood that the tactile signal from the tactile module 12 activates the piezoelectric element 52 (through appropriate electrical components) to cause the plunger 48 to reciprocate once in the directions indicated by the arrows 50 when the cursor 34 (FIG. 1) crosses a semantic edge or boundary of the graphics object 32. It will be appreciated that this causes the plunger 48 to "tap" the user's finger when the cursor 34 crosses a semantic edge or boundary of the graphics object 32. Or, the piezoelectric element 52 can be activated to cause the plunger 48 to reciprocate many times in the directions indicated by the arrows 50, to vibrate against the user's finger when the cursor 34 crosses a semantic edge or boundary of the graphics object 32. It is to be further understood that the pointing stick 44 shown in FIG. 3 is in all other essential respects identical to the cursor control device incorporated in the IBM "Trackpoint III" device.

As recognized by the present invention, by incorporating the above-described tactile generators in a cursor control device, when a cursor such as the cursor 34 crosses a graphics object 32 boundary, occasionally referred to herein as a "semantic" boundary, a tactile feedback signal is rendered to the user. With the tactile feedback, cursor 34 placement speed and precision are promoted.

Figures 5, 6:
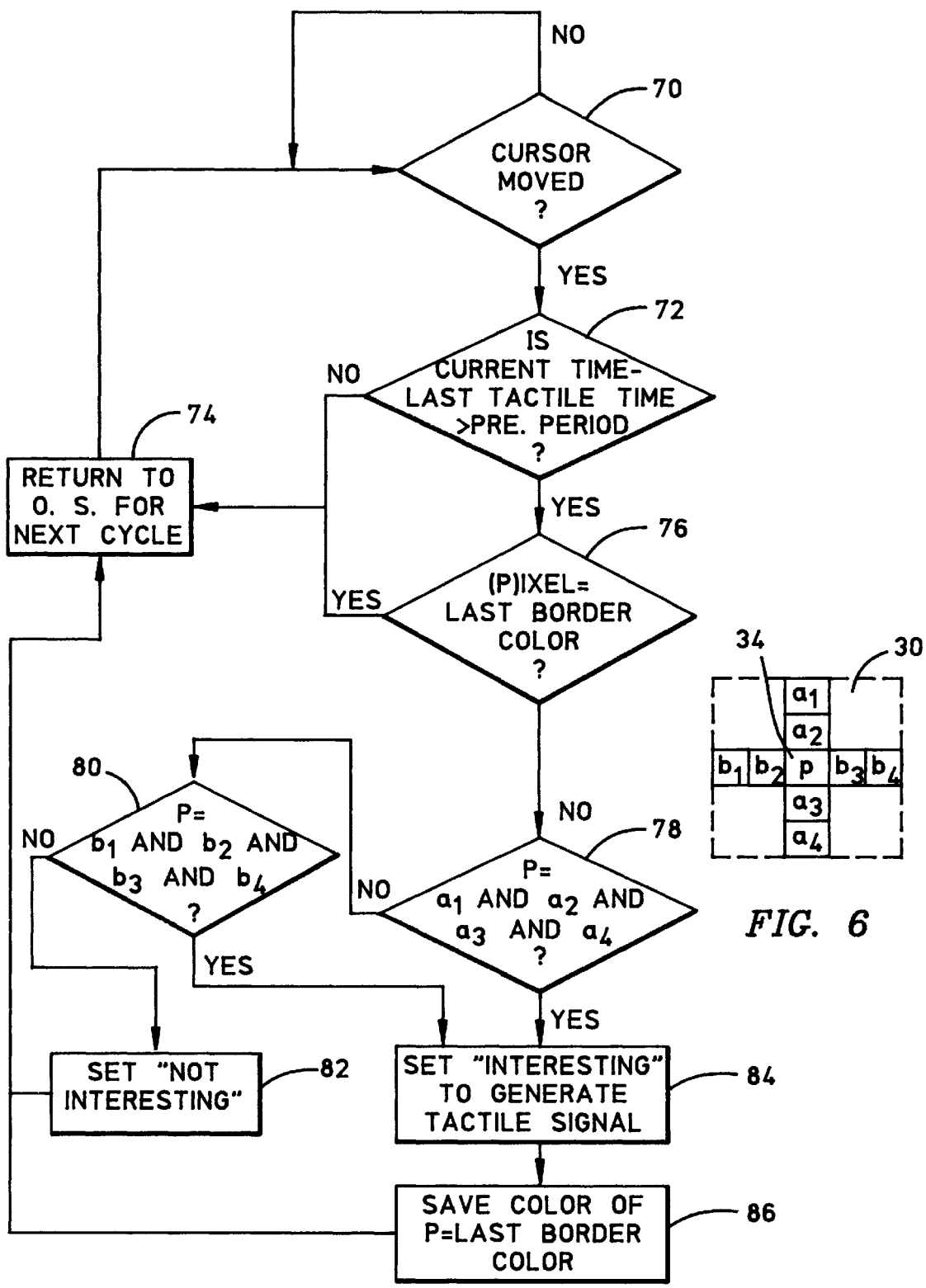
FIG. 5 is a flow chart of an alternate embodiment of the tactile control logic, as embodied in a module separate from the operating system of a computer.
FIG. 6 is a schematic diagram showing selected pixels of a computer display.

FIGS. 4 and 5 illustrate the structure of the tactile module 12 of the present invention as embodied in a logic structure, such as logic gates or, in the present embodiment, in computer program software. Those skilled in the art will appreciate that the Figures illustrate the structures of logic elements, such as computer program code elements, or microcode elements, that function according to this invention. Therefore, the invention may be practiced in the form of a machine component that renders the computer program code elements in a form that instructs a digital processing apparatus (that is, a computer) to perform a sequence of function steps corresponding to those shown in the Figures.

These instructions may reside on a program storage device including a data storage medium, such as the storage medium 20 shown in FIG. 1. The machine component is shown in FIG. 1 as a combination of program code elements A–D in computer readable form that are embodied in the computer-usable storage medium 20 in the computer 16. Alternatively, such media can also be found in semiconductor devices, on magnetic tape, on optical disks, on a DASD array, on a conventional hard disk drive, on electronic read-only memory or on electronic random access memory, or other appropriate data storage device. In an illustrative embodiment of the invention, the computer-executable instructions may be lines of compiled C++ language code. Application-specific integrated circuits or dedicated logic circuits are completely equivalent.

FIG. 4 shows the logic of the present tactile module 12, when incorporated into the operating system 18. At decision diamond 54 it is determined, for example by querying the operating system 18, whether the cursor 34 (FIG. 1) has been positioned at a boundary of a graphics object, such as the graphics object 32 (FIG. 1). If not, the logic proceeds to the next cycle at block 56. On the other hand, if the cursor 34 is at a graphics object boundary, the logic moves to decision diamond 57 to determine whether the object is a tactile object and thus "interesting".

Per the present invention, graphics objects that are colloquially referred to as "widgets" are tactile objects. Accordingly, tactile objects include pushbuttons, radio buttons, check boxes, scroll bars, menus, and resize borders.

If the graphics object is a tactile object, the logic proceeds to decision diamond 58, wherein it is determined whether it is too soon since the last tactile signal was generated to generate a tactile signal. More specifically, at decision diamond 58 it is determined whether the difference between the current time and the time of the last tactile signal exceeds a predetermined time period, e.g., one-tenth of a second (0.1 sec).

As shown in FIG. 4, if it is not too soon to generate a tactile signal, the logic moves from decision diamond 58 to decision diamond 60. At decision diamond 60, a relationship between the size of the tactile object and the speed of the cursor 34 is determined. More specifically, the ratio of the size of the tactile object and the speed of the cursor is compared to a predetermined threshold, and if the ratio exceeds the threshold, the logic proceeds to decision diamond 62. As shown in FIG. 4, if any of the tests at decision diamonds 57, 58, 60 are negative, the logic loops back to the next cycle block 56.

It is to be understood that in the presently preferred embodiment, the determination at decision diamond 60 is undertaken by using, in the numerator of the ratio, the size of the object in the dimension defined by the direction of cursor movement. In other words, the size component used at decision diamond 60 is a distance vector having a direction identical to that of the velocity vector of the cursor and a magnitude representative of the size of the object. Thus, the dimension of the ratio determined at decision diamond 60 is time. Preferably, the threshold ratio used in the comparison is one (1) second. As intended by the present invention, the tactile module 12 obtains the size of the object by appropriately querying the operating system 18.

Upon rendering a positive comparison at decision diamond 60, the logic moves to decision diamond 62, wherein it is determined whether the tactile object is a button, i.e., a pushbutton, radio button, or check box. If the object is a button, the logic moves to block 64 to generate a "normal" tactile signal. The normal tactile signal can be sent to the tactile generator of the present invention by, for example, an RS-232 data terminal ready signal (DTS) to thereby activate the tactile generator to generate a "normal" tactile stimulus, e.g., a single reciprocation of the plunger 48 shown in FIG. 3. From block 64, the logic moves to block 66 to update the last tactile time to be used for the next succeeding cycle at decision diamond 58. From block 66, the logic loops back to the next cycle block 56.

If, on the other hand, it is determined at decision diamond 62 that the object is not a button, i.e., that the object is a scroll bar or menu, the logic moves to block 68 to generate an "alternate" tactile signal. The alternate tactile signal can be sent to the tactile generator of the present invention by, for example, an RS-232 request to send (RTS) signal to thereby activate the tactile generator to generate an "alternate" tactile stimulus, e.g., a vibratory reciprocation of the plunger 48 shown in FIG. 3. From block 68, the logic moves to block 66 for operation as described previously.

FIGS. 5 and 6 show an alternate logic structure which does not require modification of a conventional operating system. Commencing at decision diamond 70, it is determined whether the cursor has moved. If not, the logic loops back to the input state of decision diamond 70, but otherwise proceeds to decision diamond 72.

At decision diamond 72, the logic determines whether it is too soon since the last tactile signal was generated to generate a tactile signal. More specifically, at decision diamond 72 it is determined whether the difference between the current time and the time of the last tactile signal exceeds a predetermined time period, e.g., one-tenth of a second (0.1 sec).

If it is too soon to generate a tactile signal, the logic moves to block 74 to return control to the operating system and await the next cycle at the input state of decision diamond 70, i.e., to await the next cursor movement. On the other hand, if it is determined at decision diamond 72 that the tactile signal disable time period has elapsed, the logic moves to decision diamond 76.

Cross-reference is now made to FIGS. 5 and 6. At decision diamond 76, it is determined whether the color of the pixel at which the cursor is located (pixel "P" in FIG. 6, labelled with the reference numeral 34 of the cursor shown in FIG. 1) is a border color. If it is, the pixel is not interesting, and the logic loops back to block 74. In contrast, if the color of the pixel "P" is not a border color, the logic moves to decision diamond 78.

As can be appreciated in cross-reference to FIGS. 5 and 6, at decision diamond 78 it is determined whether the color of the pixel "P" is the same as the colors of the pixels that are immediately adjacent the pixel "P", in the same column as the pixel "P". More particularly, at decision diamond 78 it is determined whether the color of the pixel "P" is the same as the adjacent (to the pixel "P") same-column pixels $a_2$ and $a_3$, and also whether the color of the pixel "P" is the same as the same-column pixels a, and $a_4$ that are respectively adjacent the pixels $a_2$ and $a_3$.

If the test at decision diamond 78 is negative, the logic flows to decision diamond 80, wherein the test at decision diamond 78 is essentially repeated, but using same-row pixels. Specifically, at decision diamond 80 it is determined whether the color of the pixel "P" is the same as the colors of the pixels that are immediately adjacent the pixel "P", in the same row as the pixel "P". More specifically, at decision diamond 80 it is determined whether the color of the pixel "P" is the same as the adjacent (to the pixel "P") same-row pixels $b_2$ and $b_3$, and also whether the color of the pixel "P" is the same as the same-row pixels $b_1$ and $b_4$ that are respectively adjacent the pixels $b_2$ and $b_3$.

If the test at decision diamond 80 is negative, the logic defines the pixel "P" to be "not interesting" at block 82. Then the logic loops back to block 74.

If either test at decision diamond 78 or 80 is positive, however, the logic moves to block 84 to define the pixel (and, hence, an object which it represents) to be "interesting". In other words, at block 84 the tactile signal is generated. Then, moving to block 86 the color of the pixel "P" is defined to be the border color used in the test at decision diamond 76 in the next subsequent cycle. From block 86, the logic moves back to block 74.

While the particular TACTILE FEEDBACK CONTROLLER FOR COMPUTER CURSOR CONTROL DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer-implemented method for controlling a cursor, the method including displaying a cursor, moving the cursor in response to manipulation of a cursor control device, and tactilely stimulating the cursor control device when the cursor is located at a graphics object having a size bearing a predetermined relationship to a speed of the cursor.

2. The method of claim 1, further including tactilely stimulating the cursor control device when the cursor control device has not been stimulated for a predetermined amount of time.

3. The method of claim 1, further comprising determining whether the graphics object is a tactile object, prior to stimulating the cursor control device.

4. The method of claim 3, wherein it is determined whether the graphics is a tactile object by querying an operating system of a digital processing apparatus for a classification of the graphics object, and based thereon determining whether the graphics object is a member of a predetermined set of tactile objects.

5. The method of claim 3, wherein the cursor is associated with a computer display and the computer display is established by a plurality of pixels, each pixel being defined by a row and a column, each pixel having a time-varying color, and wherein it is determined whether the graphics is a tactile object by:

determining a cursor pixel at which the cursor is located;

determining whether the color of the cursor pixel is the same as the colors of at least the pixels immediately adjacent the cursor pixel in the column of the cursor pixel;

if the color of the cursor pixel is the same as the colors of at least the pixels immediately adjacent the cursor pixel in the column of the cursor pixel, defining the column of the cursor pixel to be an interesting graphical object, and otherwise determining whether the color of the cursor pixel is the same as the colors of at least the pixels immediately adjacent the cursor pixel in the row of the cursor pixel;

if the color of the cursor pixel is the same as the colors of at least the pixels immediately adjacent the cursor pixel in the row of the cursor pixel, defining the row of the cursor pixel to be an interesting graphical object, and otherwise not defining the row or column of the cursor pixel to be an interesting object.

6. An apparatus for tactilely stimulating a cursor control device that controls the movement of a cursor on a computer display, comprising:

first logic for determining whether the cursor is at a boundary of an object;

second logic for determining whether the object is a tactile object;

third logic for determining, when the object is a tactile object, a size of the object and a speed of the cursor; and fourth logic responsive to the first, second and third logic for determining whether to tactilely stimulate the cursor control device based upon the size of the object and the speed of the cursor.

7. The apparatus of claim 6, further comprising fifth logic for preventing tactile stimulation of the cursor control device until a predetermined time period has elapsed since a previous tactile stimulation of the cursor control device.

8. The apparatus of claim 7, wherein the third logic determines the ratio of the size of the object in the dimension defined by the direction of motion of the cursor, to the speed of the cursor.

9. The apparatus of claim 7, wherein the second logic queries an operating system of a digital processing apparatus associated with the computer display for a classification of the object, and based thereon determines whether the object is a member of a predetermined set of objects.

10. The apparatus of claim 7, wherein the computer display is established by a plurality of pixels, each pixel being defined by a row and a column, each pixel having a time-varying color, and wherein the system further includes:

sixth logic for determining a cursor pixel at which the cursor is located;

seventh logic for determining whether the color of the cursor pixel is the same as the colors of at least the pixels immediately adjacent the cursor pixel in the column of the cursor pixel;

eighth logic for, if the color of the cursor pixel is the same as the colors of at least the pixels immediately adjacent the cursor pixel in the column of the cursor pixel, defining the column of the cursor pixel to be an interesting graphical object, and otherwise determining whether the color of the cursor pixel is the same as the colors of at least the pixels immediately adjacent the cursor pixel in the row of the cursor pixel; and ninth logic for, if the color of the cursor pixel is the same as the colors of at least the pixels immediately adjacent the cursor pixel in the row of the cursor pixel, defining the row of the cursor pixel to be an interesting graphical object, and otherwise not defining the row or column of the cursor pixel to be an interesting object.

11. The apparatus of claim 7, in combination with the cursor control device.

12. The combination of claim 11, in further combination with a digital processing apparatus.

13. A computer program device comprising:

a computer program storage device readable by a digital processing system; and a program means on the program storage device and including instructions executable by the digital processing system for performing a method for determining whether to generate a tactile signal in a cursor control device configured for controlling a cursor on a computer display, the cursor control device having a tactile generator responsive to the tactile signal, the method steps comprising:

determining when the cursor is located at a boundary of a graphical object on the computer display;

determining whether the graphical object is interesting;

if the graphical object is interesting, determining a relationship of the size of the graphical object with the speed of the cursor; and when the relationship of the size of the graphical object with the speed of the cursor at least equals a threshold relationship, outputting the tactile signal to thereby activate the tactile generator.

14. The computer program device of claim 13, wherein determining a relationship comprises determining the ratio of the size of the graphical object to the speed of the cursor.

15. The computer program device of claim 14, wherein determining a relationship comprises determining the ratio of the size of the graphical object in the dimension defined by the direction of motion of the cursor, to the speed of the cursor.

16. The computer program device of claim 13, wherein determining whether the graphical object is interesting comprises querying an operating system of the digital processing apparatus for a classification of the graphical object, and, based thereon, determining whether the graphical object is a member of a predetermined set of objects.

17. The computer program device of claim 13, wherein the computer display is established by a plurality of pixels, each pixel being defined by a row and a column, each pixel having a time-varying color, and wherein determining whether the graphical object is interesting includes:

determining a cursor pixel at which the cursor is located;

determining whether the color of the cursor pixel is the same as the colors of at least the pixels immediately adjacent the cursor pixel in the column of the cursor pixel; and if the color of the cursor pixel is the same as the colors of at least the pixels immediately adjacent the cursor pixel in the column of the cursor pixel, defining the column of the cursor pixel to be an interesting graphical object, otherwise determining whether the color of the cursor pixel is the same as the colors of at least the pixels immediately adjacent the cursor pixel in the row of the cursor pixel; and, if the color of the cursor pixel is the same as the colors of at least the pixels immediately adjacent the cursor pixel in the row of the cursor pixel, defining the row of the cursor pixel to be an interesting graphical object, and otherwise not defining the row or column of the cursor pixel to be an interesting object.

18. The computer program device of claim 13, wherein the signal is not output when a previous tactile signal has been generated within a predetermined time period of determining when the cursor is located at the boundary.

19. The computer program device of claim 13, in combination with the cursor control device.

20. The combination of claim 19, in further combination with the digital processing apparatus.

* * * * *